Jan. 7, 1941. H. L. BLOOD 2,227,697
TOOL HEAD FOR GRINDING MACHINES AND THE LIKE
Filed Jan. 14, 1938
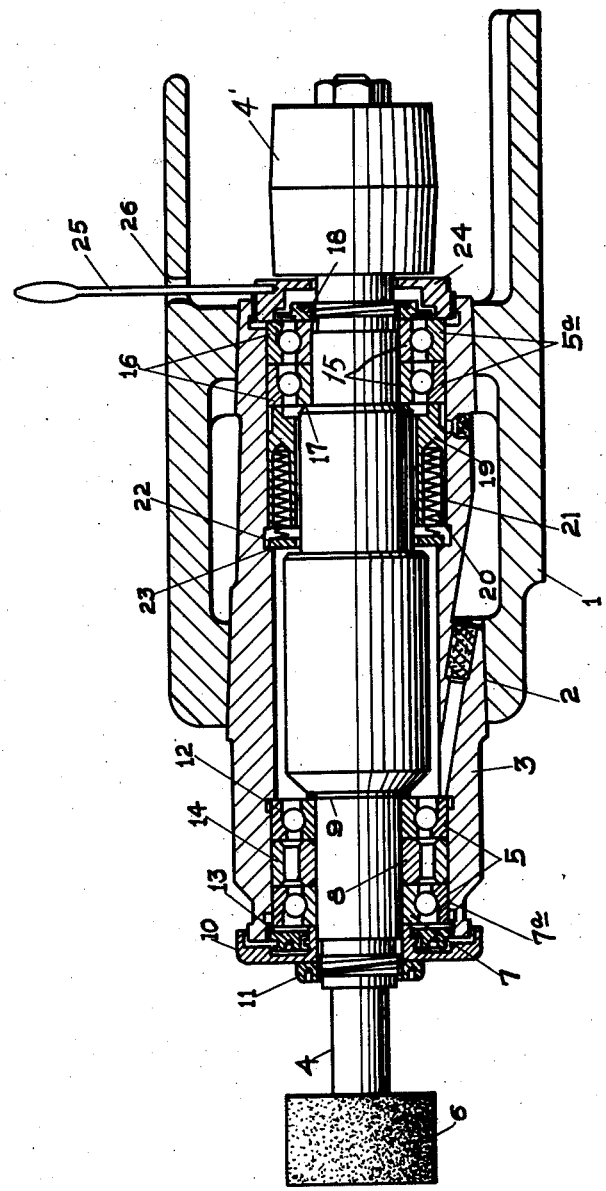
Inventor
Harold L. Blood
By Geo. H. Kennedy Jr.
Attorney Patented Jan. 7, 1941

2,227,697

UNITED STATES PATENT OFFICE 2,227,697

TOOL HEAD FOR GRINDING MACHINES AND THE LIKE

Harold L. Blood, Worcester, Mass., assignor to The Heald Machine Company, Worcester, Mass., a corporation of Massachusetts Application January 14, 1938, Serial No. 185,034

5 Claims. (Cl. 51—34)

The present invention relates to tool heads such as are used for example in connection with grinding machines, and particularly to a tool head structure which provides for a slight axial shifting movement of the spindle in order that the grinding wheel thereon, ordinarily employed for peripheral grinding, may also when desired be used for a face grinding operation.

Ordinarily, to obtain facing operations on workpieces by a relatively small grinding wheel used primarily for internal grinding, the reciprocatory table or carriage which provides for the relative axial movement between the wheel and the workpiece to traverse the wheel along the workpiece bore and to carry the parts into and out of operative position, is provided with a feeding mechanism which supplements the usual table actuating mechanism. This supplementary carriage feeding mechanism provides for shifting the carriage slowly through a relatively short portion of its travel. Although such an arrangement is entirely satisfactory in operation, it requires the use of a relatively complicated mechanism in order to control the movements of the relatively heavy table or carriage. One of the principal objects of the present invention is to provide a comparatively simple arrangement for axially shifting the grinding wheel independently of the carriage through a relatively short distance, thereby to obtain when desired a grinding operation by the face of said wheels, and to this end the invention involves a special arrangement for readily obtaining a slight axial shifting of the wheel spindle within the spindle housing.

Other and further objects and advantages of the invention will more fully appear from the following detailed description taken in connection with the accompanying drawing in which the single figure is a sectional view through a tool head embodying the invention.

With reference to the drawing, the tool head of the invention comprises a suitable supporting member 1 having a tapered bore 2 in which is received a spindle housing 3; in a conventional grinding machine, the above described parts would be mounted either on the machine base or on the usual reciprocatory table, depending upon whether the grinding wheel or the workpiece is selected as the part to be reciprocated. Within the housing 3 is suitably journalled a wheel spindle 4 as here shown by means of spaced antifriction bearings 5, 5a. An abrasive wheel 6 is mounted on one end of the spindle, the latter being rotated by a pulley 4', also mounted on the spindle.

The bearings 5, in the embodiment shown, comprise two sets of ball bearings, each of which has an inner race 7 and an outer race 7a. The two inner races 7 are held in spaced relation to each other by a ring 8 and are held against movement on the spindle 4, being clamped between a shoulder 9 on the spindle and the hub of a collar or disk 10 secured against movement on the spindle by a ring 11 having threaded engagement with the spindle.

The outer races 7a have a limited sliding movement within the housing 3, being slidable between a shoulder 12 in the housing and a ring 13 having threaded engagement with the housing. The two races 7 are held in spaced relation by a ring 14.

The bearings 5a comprise, in the embodiment shown, two sets of ball bearings having inner raceways 15 and outer raceways 16. The inner races 15 are held against axial sliding movement on the spindle, being clamped between a shoulder 17 on the spindle and a ring 18 having threaded engagement with the spindle.

The outer races 16 of ball bearings 5a are confined between a spring-pressed annulus 19 surrounding the spindle 4, and an adjustable ring 24 which has threaded engagement with the adjacent end of the housing 3. Coil springs 20 positioned parallel to the axis of the annulus in recesses 21 therein bear at one end against a disk 22 positioned within the housing 3 in engagement with a shoulder 23 provided by the housing. The coil springs urge the annulus toward the right at all times, thereby moving the outer races 16 into engagement with the adjustable ring 24 at the inner end of the housing 3.

The spindle is normally held against axial movement by reason of the pressure exerted by the coil springs 20 which hold the outer races 16 against axial movement. However, when it is desired to provide a short axial movement of the spindle for an axial feeding movement of the face of the wheel against the workpiece, the threaded ring 24 is turned by a projecting arm 25 extending through a slot 26 in the base 1. Swinging movement of the arm 25 will cause a turning movement of the ring 24, which shifts the outer races 16 to the left with a corresponding axial movement of the spindle to the left. It will be apparent that as the outer races 16 are shifted axially, the inner races 15 are similarly shifted, and since the inner races are held against axial movement on the spindle, the spindle must necessarily move therewith. The bearings 5 do not interfere with this slight axial movement of the spindle since said bearings are permitted to partake of this movement by the slight clearance between their outer raceways and the ring 13.

Although the bearings shown are the well known type of high-angle-contact bearings which makes possible a preloading of the bearing by an axial shifting movement between the inner and outer races, it will be apparent that this specific type of bearing is not essential, since the usual type of ball bearing adapted for absorbing radial and thrust loads could as readily be utilized. The essential feature is the threaded ring, which, upon being turned, shifts a part of the bearing elements relative to the housing, and thereby moves the spindle axially relative to the housing. The pre-loading springs 20 provide for holding the bearing elements against the threaded ring 24 at all times. It will be understood that the amount of axial shifting movement desired is relatively small since the main purpose is to provide a fine feeding movement of the face of the wheel against the work. It will be noted that at least one of the bearings 5a adjacent to the threaded ring 24 has its outer race 16 so arranged that a movement of the outer race to the left will assure a movement of the entire bearing as a unit, thereby assuring a movement of the spindle, together with the outer races 16 when the threaded ring is turned. This bearing, although shaped differently from the other bearings shown, is still of the familiar high-angle contact type.

I claim:

1. In a tool head of the class described, a rotary tool spindle, a housing therefor, ball bearings in said housing for said spindle, having their inner races secured against relative endwise movement thereon and having their outer races supported by said housing for limited relative endwise movement therein, spring means imposing an axial pre-load on one of said bearings, and adjustable means operable against the outer race of a bearing to shift same endwise of said housing in opposition to said spring means, thereby to procure an endwise shifting movement of said spindle and its bearings within the housing.

2. In a tool head of the class described, a rotary tool spindle, a housing therefor, ball bearings at opposite ends of said housing for said spindle, having their inner races secured against relative endwise movement thereon and having their outer races supported by said housing for limited relative endwise movement therein, spring means imposing an axial pre-load on one of said bearings, means associated with another of said bearings to resist movement of said spindle by said spring means and adjustable means operable against the outer race of a bearing to shift same endwise of said housing in opposition to said spring means, thereby to procure an endwise shifting movement of said spindle and its bearings within the housing.

3. In a tool head of the class described, a rotary tool spindle, a housing therefor, ball bearings in said housing for said spindle, having their inner races secured against relative endwise movement thereon and having their outer races supported by said housing for limited relative endwise movement therein, spring means operable between said housing and an outer bearing race for imposing an axial pre-load on one of said bearings, and adjustable means operable against the outer race of a bearing to shift same endwise of said housing in opposition to said spring means, thereby to procure an endwise shifting movement of said spindle and its bearings within the housing.

4. In a tool head of the class described, a rotary tool spindle, a housing therefor, ball bearings in said housing for said spindle, having their inner races secured against relative endwise movement thereon and having their outer races supported by said housing for limited relative endwise movement therein, spring means imposing an axial pre-load on one of said bearings, and a ring threaded in said housing and operable against the outer race of a bearing to shift same endwise of said housing in opposition to said spring means, thereby to procure an endwise shifting movement of said spindle and its bearings within the housing.

5. In a tool head of the class described, a rotary tool spindle, a housing therefor, ball bearings in said housing for said spindle, having their inner races secured against relative endwise movement thereon and having their outer races supported by said housing for limited relative endwise movement therein, spring means imposing an axial pre-load on one of said bearings, adjustable means operable against the outer race of a bearing to shift same endwise of said housing in opposition to said spring means, thereby to procure an endwise shifting movement of said spindle and its bearings within the housing, and means for limiting said endwise shifting movement of the spindle and its bearings by said adjustable means.

HAROLD L. BLOOD.